though the discharge path including resistance 74, resistance 78 and diode 80. The voltage between the negative terminal of capacitance 72 and junction 48 will steadily increase as capacitance 72 discharges, which will have the effect of steadily increasing the line voltage phase angle at which the triggering pulse is developed across resistance 44, and hence of steadily decreasing the effective portion of each line voltage half cycle during which the SCR's conduct. This will result in a steadily decreasing voltage being applied to the load, until the resistance of the R-C timing circuit exceeds the value at which the unijunction transistor 32 is unable to fire. The load voltage is thus decreased to zero in gradual steps without an abrupt voltage transition that might produce undesirable effects in the load. This action thus produces a "soft-stop" in the voltage applied to the load.

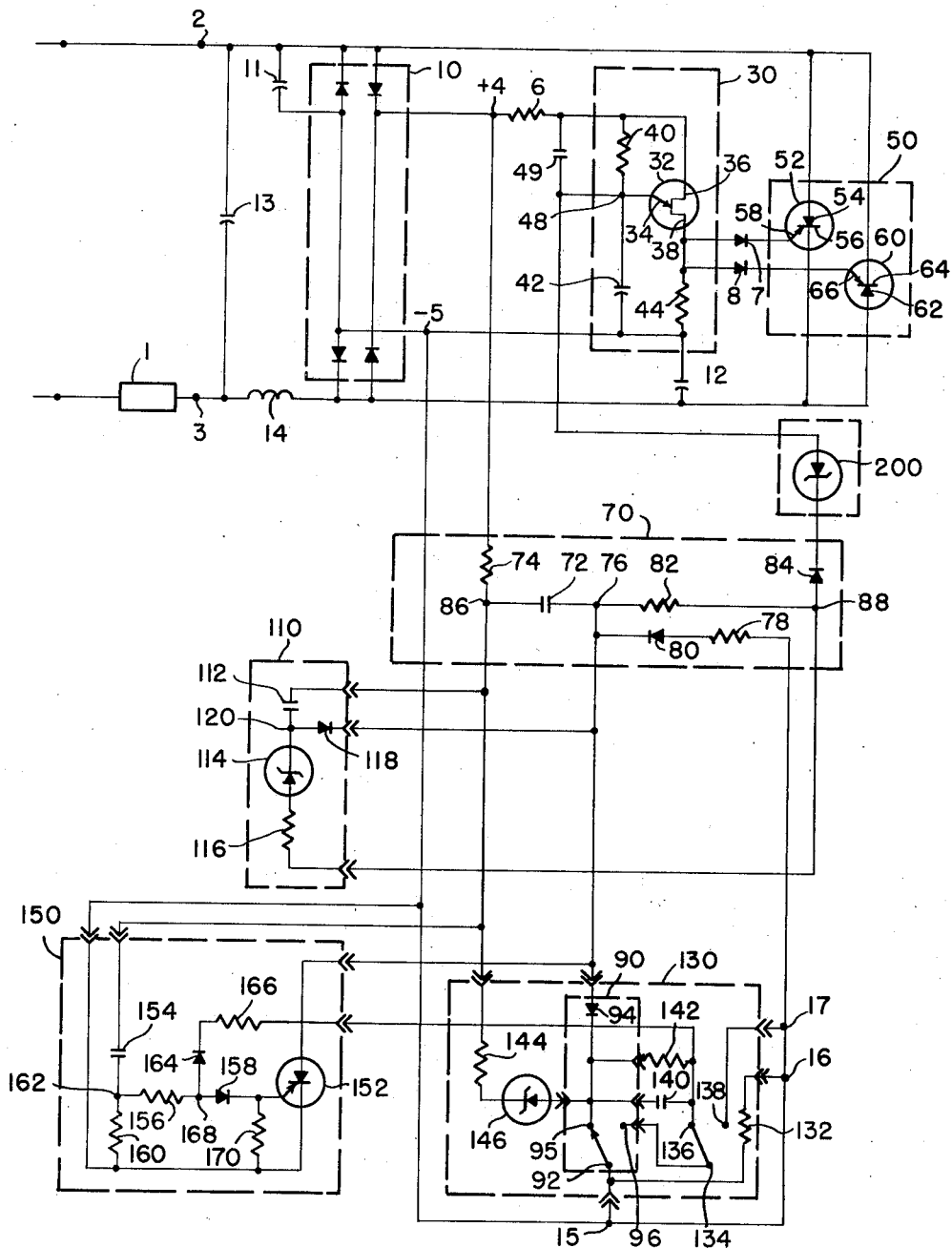

United States Patent Office 3,500,174
Patented Mar. 10, 1970

1

3,500,174
SOFT START AND SOFT STOP OF AN
A.C. VOLTAGE
Karl H. Ellerbeck, 2815 46th Ave. W.,
Seattle, Wash. 98199
Filed Feb. 21, 1968, Ser. No. 707,161
Int. Cl. G05f 3/02
U.S. Cl. 323—24                                         7 Claims

ABSTRACT OF THE DISCLOSURE

In an electrical device connected in an A.C. circuit between a power source and a load wherein a capacitive pulse generator is employed to trigger silicon-controlled rectifiers into conducting states to supply A.C. voltage to the load, a resistance-capacitance timing control network is employed to control the charging rate of the capacitive pulse generator such that the silicon-controlled rectifiers are switched to the conducting state at earlier or later line voltage phase angles such that voltage application to the load may be automatically and gradually increased, or decreased, or both.

---

This invention is a two terminal power supply for providing a variable A.C. load voltage output from A.C. power source. The power supply circuit comprises switching means for supplying A.C. voltage pulses to a load, pulse generating means coupled to the switching means for triggering the switching means, rectifier means for rectifying the A.C. input to the pulse generating means, and timing control means coupled to the pulse generating means and to the rectifier means for controllably varying the timing of triggering pulse generation responsive to the pulsating rectified input. The invention may be employed to provide "soft start" (automatic gradual increase in load voltage), "soft stop" (automatic gradual decrease in voltage), or both, and electronic flashing, depending upon the circuitry of the timing control means.

The figure depicts the circuit of the invention including the various timing control networks that may be connected into the main timing control circuit of the invention.

Referring to the figure, the load voltage regulating circuitry of this invention comprises rectifying means 10, pulse generating means 30, switching means 50, and timing control means 70–90–100–130–150. The circuitry is connected in series with a load and an A.C. power source by a pair of terminals 2–3.

The rectifier means 10 comprises a full wave diode bridge rectifier producing a pulsating full wave rectified D.C. output to positive and negative rectifier output junctions 4 and 5, respectively.

The pulse generating means 30 preferably comprises a unijunction transistor relaxation oscillator having a unijunction transistor 32 with an emitter 34 and first and second bases 38–36, a series resistance-capacitance network comprising resistance 40 and capacitance 42, and a load resistance 44. Unijunction base 36 is connected to junction 4 through a voltage-dropping resistance 6 and unijunction base 38 is connected to junction 5 through resistance 44. The resistance-capacitance network is connected between voltage-dropping resistance 6 and junction 5 in parallel with the unijunction transistor 32 and resistance 44, with the unijunction emitter 34 being connected between resistance 40 and capacitance 42 at junction 48.

The switching means 50 comprises a pair of silicon controlled rectifiers (SCR's) 52 and 60 having respective anodes, cathodes and gates 54–56–58 and 62–64–66. The SCR's are connected in parallel across the input junc-

2 tions to rectifier means 10 with their respective anodes and cathodes oppositely poled, as shown. The SCR's 52 and 60 are coupled to the output of the pulse generating means by diodes 7 and 8 connected between the first unijunction base 38 and SCR gates 58 and 66, respectively, by capacitance 11 connected between junction 5 and one of the input junctions to rectifier means 10, and by capacitance 12 connected between junction 5 and the other input junction to rectifier means 10.

A radio frequency filter is provided across the input terminals 2 and 3 and comprises a capacitance 13 and an inductance 14 connected as shown between terminals 2 and 3 and the input junctions to the rectifier means 10. If desired a suitable NPNPN switch (Triac) could be substituted for the SCR's 52 and 60. Also, a pulse transformer could be employed to couple the switchng means to the pulse generating means in substitution for resistance 44, diodes 7 and 8 and capacitances 11 and 12. The transformer primary winding would be connected between unijunction base 38 and junction 5, one secondary winding would be connected between SCR gate 58 and cathode 56, and the other secondary winding would be connected between SCR gate 66 and cathode 64.

The device as thus far described would function in the following manner in the absence of the timing control means 70–90–110–130–150. During each line voltage half cycle capacitance 42 will charge, at a rate controlled by resistance 40, until the ratio of the voltage across capacitance 42 to the voltage between unijunction bases 36–38 reaches the intrinsic stand-off ratio of the unijunction transistor 32, at which time the unijunction transistor will become conducting between its emitter 34 and its base 38, and then capacitance 42 will discharge through this path to develop a triggering voltage pulse across resistance 44. During the line voltage half cycle when the anode of SCR 52 is positive, the output pulse across resistance 44 will produce a current through diode 7, and the gate and cathode of SCR 52 to charge capacitance 12 and thereby trigger SCR 52 into a conducting state, unless the line voltage phase angle at triggering is near 0° or 180°. During the line voltage half cycle when the anode of SCR 60 is positive, the output pulse across resistance 44 will produce a current through diode 8, and the gate and cathode of SCR 60 to charge capacitance 11 and thereby trigger SCR 60 into a conducting state, unless the line voltage phase angle at triggering is near 0° or 180°. The SCR's will remain conducting from anode to cathode until near the end of each respective line voltage half cycle.

The value of resistance 40 can be selected to time the output pulse with almost any desired line voltage phase angle. The basic timing control, however, is provided by the main timing control circuits 70 and 90. These circuits provide a resistance-capacitance network connected to the output junctions 4 and 5 from the rectifier means 10 and to the pulse generating means junction 48 as shown, and comprise a main timing capacitance 72 and resistance 74 connected in series between output junction 4 and junction 76, a two position switch 92 having a closed contact 95 and an open contact 96, and a diode 94 connected in series between output junction 5 and junction 76, a resistance 78 and diode 80 connected in series between junctions 5 and 76, and resistance 82 and diode 84 connected in series between junction 76 and 48, as shown.

With circuits 110–130–150 disconnected, the operation of circuits 70–90 is as follows. When switch 92 is closed as shown, the main timing capacitance 72 will be rapidly charged through the path including resistance 74 and diode 94, resistance 74 having a value only high enough to limit current through the rectifier means 10 to a safe value during this rapid charging. When switch 92 is opened, the main timing capacitance will discharge slowly through the path including resistance 74, junction 4, resistance 6, the unijunction bases 36–38, resistances 44 and 78, diode 80, and junction 76.

When switch 92 is closed as shown, junction 76 will be at the negative peak of the rectified A.C. line voltage with respect to junction 4 with a slight twice-line-frequency sawtooth ripple, and junction 5 will be pulsing between zero and this negative peak voltage with respect to junction 4 at twice-line-frequency. Consequently there will be no current through diode 84 and circuits 70–90 will have no effect on the pulse generating means 30.

When switch 92 is opened, the main timing capacitance 72 will begin slowly discharging through the slow discharge path defined above. As capacitance 72 slowly discharges, the potential at junction 76 will gradually become more positive with respect to junction 5, providing a second charging path for capacitance 42 (through resistance 82, diode 84 and junction 48) in addition to its normal charging path through resistance 40. The slightly discharged main timing capacitance 72 will then tend to charge in series with resistance 82 and capacitance 42. Thus during each line voltage half cycle, the main timing capacitance 72 will discharge a small amount and recharge a small amount, with the relative values of resistance 78 and 82 being selected to cause the main timing capacitance 72 to discharge more than it charges during each line voltage half cycle or vice-versa. (Resistance 78 affects the discharge rate of the main timing capacitance 72 and resistance 82 affects the charging rates of the main timing capacitance 72 and the capacitance 42. Thus, the amounts of incremental charge and discharge of the main timing capacitance 72 during each line voltage half cycle are separately controllable.)

In this arrangement, the charging rate of capacitance 42 at any instant is a function of the instantaneous rectifier output voltage minus the voltage to which the main timing capacitance 72 is charged. If the value of resistance 78 is selected to make the main timing capacitance discharge more than it charges during each line voltage half-cycle, the result will be a slowly discharging main timing capacitance 72 with a small sawtooth voltage ripple, with a concomitant slowly increasing charging rate for capacitance 42 during each line voltage half cycle. As the charging rate for capacitance 42 increases, the ratio of the voltage across capacitance 42 to the voltage between the unijunction bases 36–38 will slowly reach the intrinsic stand-off ratio of the unijunction transistor 32 at earlier line voltage phase angles such that the SCR's 52 and 60 will be gradually triggered to their conducting states at earlier line voltage phase angles and transmit greater voltages to the load 1. The result is an automatic gradually increased load voltage output. And if the value of resistance 40 is selected such that the normal charge rate of capacitance 42 is so low that the intrinsic stand-off ratio of the unijunction transistor 32 is not reached until a line voltage phase angle of about 170° such that the SCR's 52 and 60 will normally not be triggered into the operating state (i.e. such that a zero load voltage is produced when switch 92 is closed), the gradual discharge of the main timing capacitance 72 will result in a "soft start" in the application of power to the load 1 from zero to full power.

In the event that the "soft start" condition produced by circuits 70–90 is not sufficiently linear, the resistance-capacitance shunting network of circuit 110 may be connected as shown. Circuit 110 comprises a secondary timing capacitance 112, a Zener diode 114 and a resistance 116 connected in series across the main timing capacitance 72 and resistance 82 at junctions 86 and 88, and a diode 118 connecting the secondary timing capacitance 112 at junction 120 to junction 76. The values of the secondary timing capacitance 112 and resistance 116 are preferably substantially lower than the values of the main timing capacitance 72 and resistance 82 such that the incremental charging time constant of the shunting network 110 will be negligible relative to the time constant of the network consisting of main timing capacitance 72 and resistance 82. Diode 118 enables the secondary timing capacitance 112 to be charged to a higher voltage than the main timing capacitance 72 but prevents the secondary timing capacitance 112 from being discharged to a lower voltage than the main timing capacitance 72.

Zener diode 114 functions as a voltage-controlled switch in that it prevents the secondary timing capacitance 112 from being effective until the main timing capacitance 72 has been discharged an amount equal to the Zener reverse breakdown voltage. Thereafter the path through Zener diode 114 will gradually become the main charging path for capacitance 42 with the result that the charge received by the main timing capacitance 72 during each load voltage half cycle will be gradually reduced, thereby tending to effect a gradual increase in the discharge rate of the main timing capacitance 72. Since the discharging rate for the main timing capacitance 72 would decrease in the absence of circuit 110, the presence of circuit 110 will therefore cause the load voltage change to be more linear.

To provide automatic "soft stop" in addition to "soft start" circuit 130 may be provided in conjunction with circuits 70, 90 and 110 connected as shown. This circuit comprises a resistance 132 connected in series with resistance 78 between the base of switch 92 and junction 76 in substitution for the non-resistive path between points 15 and 16, a two position switch 134 having a base connected to contact 96 of switch 92 and two contacts 136–138 (contact 138 being connected to point 17 to bypass resistance 132), a capacitance 140 and resistance 142 connected in parallel across contacts 136 and 95, and a resistance 144 and Zener diode 146 connected in series between contact 95 and junction 86.

With switch 134 on contact 138, circuit 130 has no appreciable effect inasmuch as resistance 132 is thereby bypassed, and shifting switch 92 to contact 96 will result in a "soft start" as previously described. However, with switch 92 on contact 96, shifting switch 134 from contact 138 to contact 136 places resistance 132 in series with resistance 78 so that the main timing capacitance 72 will be charged more than discharged during each line voltage half cycle thereby causing the load voltage to slowly decrease.

In addition, capacitance 140 is provided in series with the main timing capacitance 72 thereby effecting an increase in the incremental charge received by the main timing capacitance 72 inasmuch as capacitance 140 is charged in series and discharged in parallel with the main timing capacitance 72, the discharge path for capacitance 140 being through Zener diode 146. The net effect is that the charging rate of the main timing capacitance 72 is accelerated until the Zener diode 146 starts reverse conduction, raising the voltage on contact 95, causing diode 94 to become non-conducting, at which point capacitance 140 will no longer affect the charging rate of the main timing capacitance 72. The "soft stop" is more linear than it would otherwise be absent the effect of capacitance 140 and Zener diode 146. Therefore, the provision of both circuits 110 and 130 can provide for linearly matched "soft start" and "soft stop" by actuation of switch 134.

Any combination of 70, 90 and 110 may be employed with circuit 150 to provide electronic flashing operation with or without a series A.C. line switch. Or any combination of circuits 70, 90, 110 and 130 may be employed with circuit 150 when electronic flashing is not to be provided but use with a series A.C. line switch is required. Circuit 150 comprises an SCR 152 connected anode-to-cathode between junctions 76 and 5, a capacitance 154 and resistance 156 and diode 158 connected in series between the gate of SCR 152 and junction 86, and a resistance 160 connected in series with capacitance 154 between the junction 162 and junction 5. If circuit 150 is provided in conjunction with circuit 130, a diode 164 and resistance 166 are connected in series between the junction 168 and the contact 136. Capacitance 154 has a rapid charging path through resistance 156 and the gate-cathode path of SCR 152. Capacitance 154 has a slow discharge path through resistance 160. If SCR 152 requires a gate-to-cathode resistance for normal operation, resistance 170 would be provided.

When switch 92 is shifted open to contact 96 and as the load voltage begins to increase, capacitance 154 will be charged to about the line voltage peak with a slight twice-line-frequency sawtooth ripple. As the load voltage continues to rise due to the increasing on-to-off ratio of SCR's 52 and 60, the sawtooth ripple amplitude will increase until the charging increment of the ripple is sufficient to trigger SCR 152 into a conducting state. SCR 152 then will momentarily conduct to rapidly recharge capacitance 72 thereby dropping the load voltage to zero and the "soft start" cycle will then repeat.

When circuit 130 is provided, resistance 166 has a low enough value to prevent operation of the SCR 152 when switch 134 is shifted to contact 136 but a high enough value to permit operation of SCR 152 upon closure of a series A.C. line switch when switch 92 is on contact 96 and switch 134 is on contact 136. In this case, resistance 160 has a high enough value to prevent operation of SCR 152 except at closure of the series A.C. line switch.

To provide a delay in the effect of the main timing capacitance 72, a Zener diode 200 may be provided between junctions 88 and 48 such that the main timing capacitance 72 must discharge an amount equal to the Zener reverse breakdown voltage thereby providing a start delay and a significant "off" period during flashing operation. This delay, or "off" period can be increased by also providing a capacitance 49 between junction 48 and the junction of resistances 6 and 40.

It is believed that the invention will have been clearly understood from the foregoing detailed description of my now-preferred illustrated embodiment. Changes in the details of construction may be resorted to without departing from the spirit of the invention and it is accordingly my intention that no limitations be implied.

For example, the addition of a variable resistance in series with diode 84 will provide a "soft start" manual dimmer. Also small electromagnetic relays can be substituted for the switches inasmuch as the switch current requirements are small.

The embodiments of the invention in which an exclusive property or privilege are defined as follows:

1. Apparatus for controllably varying an A.C. load voltage which comprises first and second terminals adapted to be connected to an A.C. power source and to a load; rectifying means having input and output junctions, said input junctions being connected to said terminals; pulse generating means including first capacitance means, said pulse generating means being connected to said output junctions and adapted to deliver a triggering pulse during each line voltage half cycle at a phase angle determined by the charging rate of said first capacitance means; switching means coupled to said pulse generating means and connected to said terminals, said switching means being switched into a conducting state responsive to triggering pulses delivered by said pulse generating means to provide voltage output to said load of a magnitude determined by the line voltage phase angle existing at the onset of a conducting state; and timing control means comprising a resistance-capacitance network including a main timing capacitance, said resistance-capacitance network being connected to said output junctions and to said first capacitance means such that said main timing capacitance will be incrementally charged and discharged during each line voltage half cycle and such that the charging rate of said first capacitance is dependent upon the difference between the voltage across said output junctions and the voltage to which said main timing capacitance is charged.

2. Apparatus according to claim 1 wherein said timing control means comprises first resistance means providing an incremental charging path for said main timing capacitance and second resistance means providing an incremental discharge path for said main timing capacitance such that the charging and discharging rates of said main timing capacitance are determined independently of one another.

3. Apparatus according to claim 2 wherein the relative values of said first and second resistance means are selected to effect a gradual discharge of said main timing capacitance such that the load voltage will automatically gradually increase.

4. Apparatus according to claim 3 wherein said timing control means includes a resistance-capacitance network including a secondary timing capacitance and voltage-sensitive switch means coupled to said main timing capacitance such that said switch means becomes conducting when said main timing capacitance has been discharged a predetermined amount and such that thereafter said secondary timing capacitance is gradually discharged to effect a gradual increase in the discharge rate of said main timing capacitance so as to effect a gradual increase in the load voltage of substantial linearity.

5. Apparatus according to claim 3 wherein said timing control means including switch means and third resistance means coupled to said main timing capacitance such that said third resistance means can be switched into series with said second resistance means to decrease the discharge rate of said main timing capacitance so as to effect a gradual decrease in the load voltage.

6. Apparatus according to claim 5 wherein said timing control means includes a resistance-capacitance network including a capacitance and a Zener adapted to be coupled to said main timing capacitance by said switch means such that said capacitance charges in series and discharges in parallel with said main timing capacitance so as to accelerate the charging rate of said main timing capacitance until said main timing capacitance has been charged a predetermined amount to effect a gradual decrease in the load voltage of substantial linearity.

7. Apparatus according to claim 3 wherein said timing control means includes a silicon-controlled rectifier and a resistance-capacitance network coupled to said main timing capacitance such that said silicon-controlled rectifier is triggered to momentarily conduct when said load voltage increases to a predetermined level to rapidly recharge said main timing capacitance and effect a rapid drop in said load voltage.

References Cited

UNITED STATES PATENTS

| | | | |
|---|---|---|---|
| 3,146,392 | 8/1964 | Sylvan | 323—22 |
| 3,377,542 | 4/1968 | Glorioso | 323—22 X |
| 3,363,143 | 1/1968 | Cavanaugh. | |
| 3,389,328 | 6/1968 | Janson | 323—41 X |

W. M. SHOOP, Jr., Primary Examiner

G. GOLDBERG, Assistant Examiner

U.S. Cl. X.R.

307—293; 323—36, 41